United States Patent [19]
Heinemann et al.

[11] Patent Number: 4,597,867
[45] Date of Patent: Jul. 1, 1986

[54] AIR-CONTROLLED SETTLING APPARATUS

[75] Inventors: Otto Heinemann, Ennigerloh; Heinz-Dieter Baldus, Ahlen; Armin Supp, Hamm; Hans Nanz, Ennigerloh; Helmut Thieme, Nottuln; Heinz Rasch, Oelde, all of Fed. Rep. of Germany

[73] Assignee: Krupp Polysius AG, Beckum, Fed. Rep. of Germany

[21] Appl. No.: 705,355

[22] Filed: Feb. 25, 1985

[30] Foreign Application Priority Data

Mar. 8, 1984 [DE] Fed. Rep. of Germany ....... 3408378

[51] Int. Cl.[4] .............................................. B01D 21/24
[52] U.S. Cl. ................................ 210/218; 210/221.2; 210/253; 210/322
[58] Field of Search ............... 210/150, 151, 218, 220, 210/221.2, 197, 253, 322, 533

[56] References Cited

U.S. PATENT DOCUMENTS

| | | | |
|---|---|---|---|
| 3,997,444 | 12/1976 | McGivean | 210/322 |
| 4,100,071 | 7/1978 | Beurea | 210/218 |
| 4,136,023 | 1/1979 | Kirk et al. | 210/218 |

FOREIGN PATENT DOCUMENTS

| | | | |
|---|---|---|---|
| 2532682 | 2/1977 | Fed. Rep. of Germany | 210/218 |
| 3326326 | 2/1984 | Fed. Rep. of Germany | 210/221.1 |

*Primary Examiner*—John Adee
*Attorney, Agent, or Firm*—Learman & McCulloch

[57] ABSTRACT

The invention relates to an air-controlled settling apparatus having an air vessel within which is a wall that divides the vessel into air supply and air exhaust ducts. Inlet and outlet valves are mounted within the air supply duct and establishes communication between the settling chambers and the air supply and exhaust ducts. The apparatus construction is distinguished by simple construction and low noise in operation.

11 Claims, 2 Drawing Figures

AIR-CONTROLLED SETTLING APPARATUS

The invention relates to air-controlled, wet settling apparatus having settling compartments in which the water surface is subjected to pulses of compressed air.

BACKGROUND OF THE INVENTION

In previously known air-controlled settling apparatus of the kind to which the invention relates the air inlet and outlet valves of the air chambers associated with the individual settling compartments are arranged below the air vessel, and the air flows out of the air vessel through the air inlet valves into the air chambers of the settling compartments whilst being subjected to multiple deflection. The exhaust air duct is located a certain distance below the air vessel so that the air flowing out of the air chambers of the settling compartments through the air outlet valves also flows into the exhaust air duct and is subjected to marked deflection.

These known constructions are hampered by some considerable shortcomings. The free, unprotected arrangement of the numerous valves leads in operation to a considerable nuisance from noise which is also contributed to by the strong multiple deflection of the air streams caused by the valve arrangement (which also results in an undesirable pressure loss). A further disadvantage is the considerable expense caused by the large number of complete valve units which are required. The exhaust air duct provided in the interior of the valve arrangement also contributes to the expenditure on apparatus.

The object of the invention, therefore, is to avoid these shortcomings and provide an air-controlled settling apparatus wherein the construction cost is considerably lower and the noise of the settling apparatus in operation is markedly reduced.

SUMMARY OF THE INVENTION

According to the invention the air inlet and outlet valves, including their actuating means, are arranged in the air vessel, thereby achieving a considerable damping of the noise coming from these valves, as well as a very desirable reduction in the loudness of the settling apparatus in operation. This is also contributed to by the fact that the arrangement according to the invention of the air inlet and outlet valves and of the exhaust air duct makes it possible to achieve an almost rectilinear run of the air ducts between the air inlet valve and the air inlet opening of the air chamber. This largely rectilinear flow path of the air from the air vessel through the air inlet valve into the air chamber and out of the air chamber through the air outlet valve into the exhaust air duct also leads to reduced pressure losses and thus is also advantageous for reasons of energy conservation.

The arrangement of the air inlet and outlet valves including their actuating means, in the air vessel also facilitates a particularly simple and very economical design of these valves which, in view of the large number of valves present in a large settling apparatus, makes a considerable reduction in the production costs possible.

The air vessel is so constructed as to enable the maintenance of the valves and their actuating means to be carried out very easily. If it should be necessary to carry out such maintenance work during operation of the settling apparatus (which is quite possible with the relatively low excess pressure of 0.3 to 0.5 bars prevailing in the air vessel), then the air vessel is provided with an access in the form of a lock.

According to the invention the air vessel is divided by a wall or partition into an air supply duct and an exhaust air duct. In this way a compact and particularly economical construction is achieved.

The exhaust air duct can either be built directly onto the housing of the air vessel or it can be provided in the housing of the air vessel, and is separated by a partition from the interior of the air vessel which is under excess pressure.

THE DRAWINGS

The foregoing and other features of the invention are explained hereinafter in greater detail and illustrated in the accompanying drawings, wherein:

FIG. 1 is a vertical cross-section taken on the line I—I of FIG. 2 and illustrating one embodiment of settling apparatus according to the invention; and FIG. 2 is a longitudinal section taken along the line II—II of FIG. 1.

DETAILED DESCRIPTION

Figure 1:
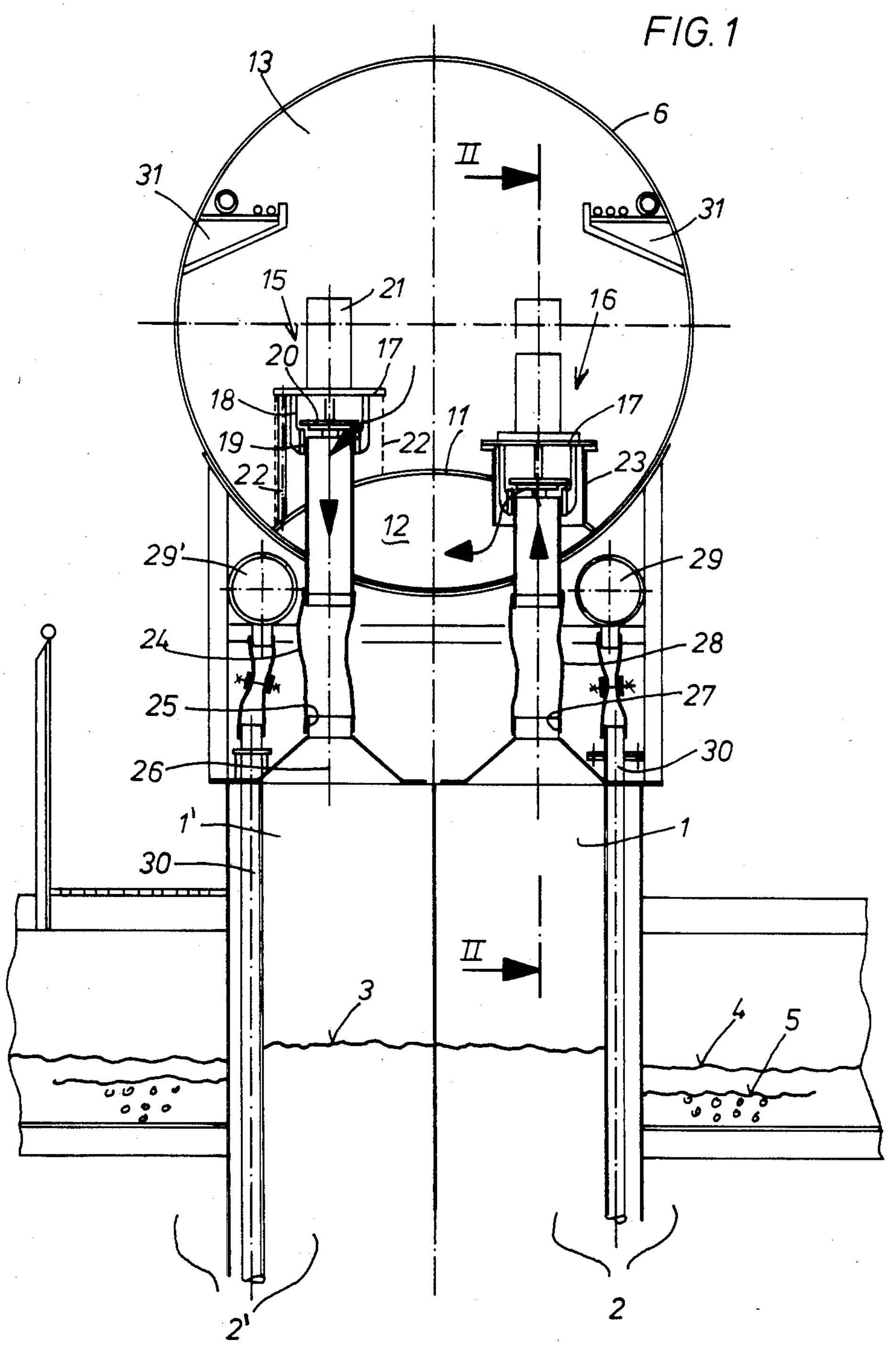
Figure 2:
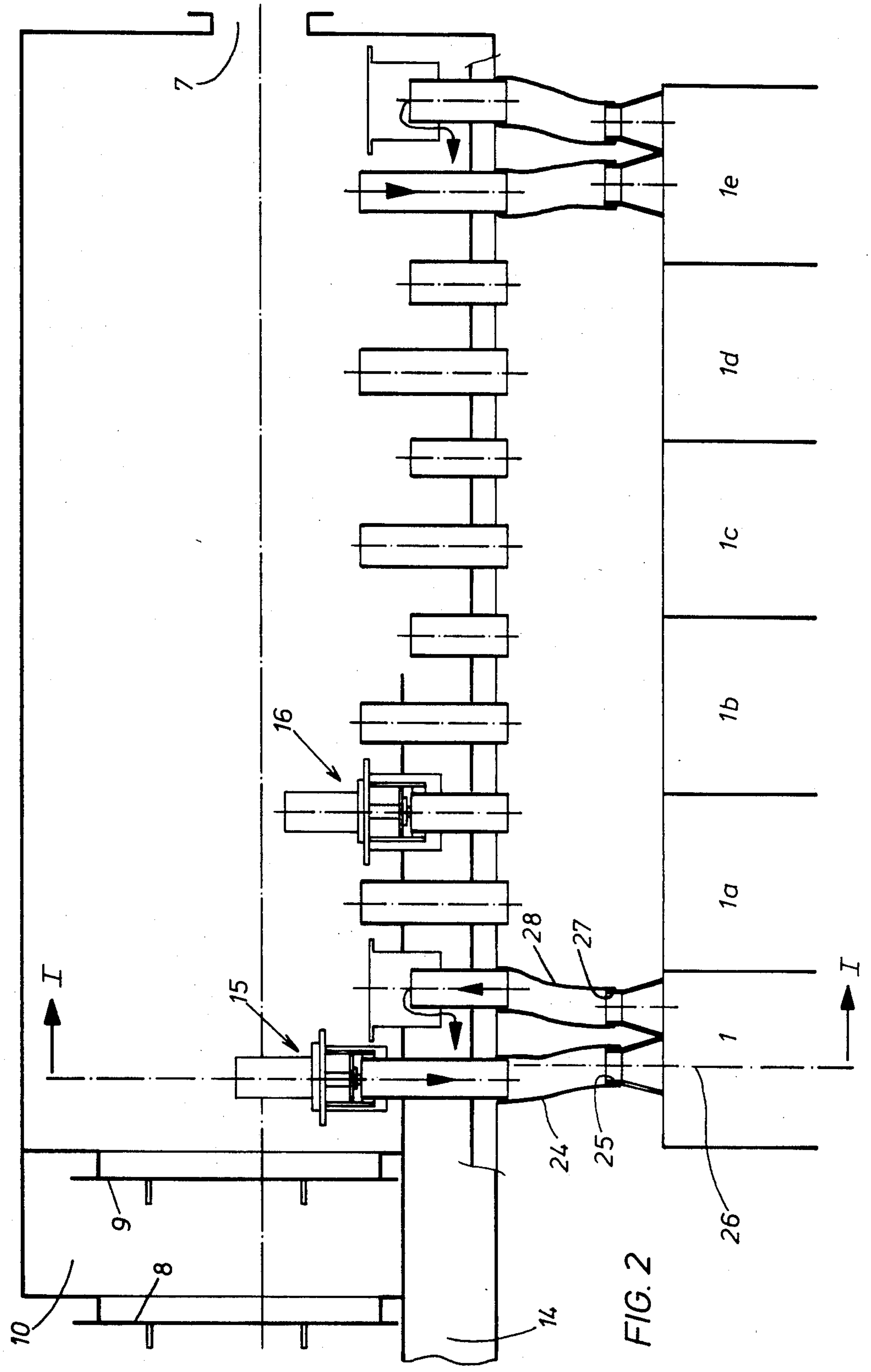

Only the upper part of the air-controlled settling apparatus which is essential for an understanding of the invention is shown in the drawings. It is assumed to be a pulsating air, double apparatus with two settling beds arranged adjacent to one another and each including a plurality of compartments arranged one behind the other. FIG. 1 shows the air chambers 1 and 1' of the settling compartments 2, 2' which are located below them and associated with two settling beds adjacent to one another. FIG. 2 shows the air chambers 1, 1*a*, 1*b*, 1*c*, 1*d* and 1*e* of the six settling compartments which are arranged one behind the other of one settling bed. The whole apparatus thus contains twelve settling compartments in all with a corresponding number of air chambers through which the water level 3 is periodically subjected to pulses of compressed air. In the outer region of the settling compartments the water level is designated by 4 and the level of the settled material is designated by 5.

An elongated tubular air vessel 6 which is provided with an air connection 7 on its right-hand front end and a lock 10 defined by two lock gates 8 and 9 on its left-hand front end serves for the supply of air to the air-controlled wet settling apparatus. The interior of the air vessel 6 is accessible via the lock 10.

A partially cylindrical wall or partition 11 within the vessel 6 defines an exhaust air duct 12 of lenticular cross-section and an air supply duct 13 in the air vessel 6. The wall 11 is common to both ducts. The exhaust air duct 12 extends over the whole axial length of the air vessel 6 and is connected at the left-hand front end to an exhaust air pipe 14.

The air inlet and outlet valves, including the actuating means therefor, are arranged within the air vessel 6. One air inlet valve 15 and one air outlet valve 16 are associated with each air chamber of a settling compartment. In this case two valves associated with the same air chamber lie behind one another in the axial direction of the air vessel 6. Therefore, in the cross-sectional view in FIG. 1 in each case one of the two valves associated with the same air chamber is covered. Accordingly FIG. 1 shows the air inlet valve 15 to the air chamber 1' and the air outlet valve 16 of the air chamber 1. By contrast, in the longitudinal sectional view in FIG. 2 the air inlet valve 15 to the air chamber 1 and the air outlet valve 16 to the air chamber 1*a* are shown.

Each air inlet and air outlet valve includes a base plate 17 positioned within the air vessel 6, a valve seat 19 mounted by means of struts 18 on the base plate 17 at a distance therefrom, and a valve disc 20 which cooperates with the valve seat 19. A pneumatic actuating cylinder 21 is arranged on the side of the base plate 17 facing away from the valve disc 20, i.e. on the upper side thereof, and serves to open and close the valve disc 20 relative to its seat.

The base plate 17 of each of the air inlet valves 15 is supported on the partition 11 by means of individual stays 22. In the case of the air outlet valves 16, however, each base plate 17 is supported by a short piece of tubular pipe 23 which is mounted on the partition 11 and opens into the exhaust air duct 12.

The connection between the air inlet valves 15 and the associated air chambers (e.g. 1', cf. FIG. 1) is formed by a duct 24 which runs approximately in a straight line and leads to an air inlet opening 25 which lies approximately in the vertical central axis 26 (cf. FIGS. 1 and 2) of the relevant air chamber. The air outlet opening 27 (cf. FIGS. 1 and 2), on the other hand, is longitudinally offset somewhat with respect to this vertical central axis 26. However, the duct 28 which leads from this air outlet opening 27 to the air outlet valve 16 also runs approximately in a straight line.

The water supply pipes to the two settling beds are designated by 29 and 29'. From these pipes branch pipes 30, 30' lead to the individual settling compartments.

Supports 31 for pipes and cables are provided in the air vessel 6.

When the air-controlled wet settling apparatus is in operation the air inlet and outlet valves 15 and 16, respectively, of the air chambers associated with the individual settling compartments are actuated alternately, so that the surface of the water in the individual settling compartments is struck by successive pulses of compressed air. An air stream from the interior 13 of the air vessel 6 passes through an opened inlet valve 15 into the duct 24 and passes without appreciable deflection to the air inlet opening 25 which is arranged centrally above the surface of the water 3 in the relevant air chamber (e.g. 1'). Air from the air supply duct 13 then enters the exhaust gas duct 12 via the duct 28 and the air outlet valve 16.

The drawings show the particularly simple design of the air inlet and outlet valves which results from the valves being constructed practically without a housing due to their being located in the air vessel 6. This not only considerably simplifies the design but at the same time makes maintenance much easier.

Although in the embodiment described above a double apparatus is assumed (with two settling beds arranged adjacent to one another), the principle of the invention can of course be applied to settling apparatus containing only one settling bed which consists of a plurality of settling compartments arranged one behind the other.

We claim:

1. Air-controlled settling apparatus comprising means forming a plurality of settling compartments each of which has a chamber having an air inlet and an air outlet; an air vessel; an air supply duct in said vessel; an exhaust air duct in said vessel; an air inlet valve for each of said chambers; an air outlet valve for each of said chambers; means mounting all of said valves in said vessel; first duct means establishing communication between each of said inlet valves and the associated chamber; second duct means establishing communication between each of said outlet valves and the associated chamber; and closure means for said vessel movable between open and closed positions for providing access to said valves.

2. Settling apparatus according to claim 1 wherein the first duct means runs approximately in a straight line between the air inlet valve and the air inlet of the associated air chamber.

3. Settling apparatus according to claim 1 wherein each air inlet lies approximately in the vertical central axis of the associated chamber while the associated air outlet is offset with respect to said axis.

4. Settling apparatus according to claim 1 wherein each of said valves has a base plate in the air vessel, a valve seat at one side of said base plate and spaced therefrom by struts, a valve disc cooperable with said valve seat, and an actuating cylinder on the opposite side of the base plate for actuating the valve disc.

5. Settling apparatus according to claim 1 wherein the said vessel has a common wall separating said supply duct and said exhaust duct.

6. Settling apparatus according to claim 5 wherein the base plate of each air inlet valve is mounted by means of individual stays on said common wall.

7. Settling apparatus according to claim 5 wherein the base plate of each air outlet valve is mounted on the common wall by a pipe which extends into the exhaust air duct.

8. Settling apparatus according to claim 1 wherein said closure means comprises a lock.

9. Settling apparatus according to claim 1 wherein the exhaust air duct has a lenticular cross-section.

10. Settling apparatus according to claim 1 wherein the settling compartments are arranged one behind the other.

11. Settling apparatus according to claim 1 wherein the settling apparatus includes two settling beds arranged adjacent to one another, each of said beds having a plurality of said compartments arranged one behind the other, and each of said beds having a common air supply.

* * * * *